United States Patent
Wang et al.

(10) Patent No.: US 12,437,507 B2
(45) Date of Patent: Oct. 7, 2025

(54) IMAGE ANALYSIS METHOD, IMAGE ANALYSIS APPARATUS, AND IMAGE ANALYSIS SYSTEM

(71) Applicant: TENCENT TECHNOLOGY (SHENZHEN) COMPANY LIMITED, Shenzhen (CN)

(72) Inventors: Xiaoning Wang, Shenzhen (CN); Jianhua Yao, Shenzhen (CN); Hong Shang, Shenzhen (CN); Han Zheng, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 630 days.

(21) Appl. No.: 17/699,056

(22) Filed: Mar. 18, 2022

(65) Prior Publication Data

US 2022/0207862 A1 Jun. 30, 2022

Related U.S. Application Data

(63) Continuation of application No. PCT/CN2021/080185, filed on Mar. 11, 2021.

(30) Foreign Application Priority Data

Apr. 1, 2020 (CN) .......................... 202010250222.4

(51) Int. Cl.
*G06V 10/00* (2022.01)
*G06V 10/22* (2022.01)
(Continued)

(52) U.S. Cl.
CPC .......... *G06V 10/764* (2022.01); *G06V 10/225* (2022.01); *G06V 10/774* (2022.01);
(Continued)

(58) Field of Classification Search
CPC .. G06V 10/764; G06V 10/225; G06V 10/774; G06V 10/776; G06V 10/82;
(Continued)

(56) References Cited

U.S. PATENT DOCUMENTS

| | | | |
|---|---|---|---|
| 2018/0357816 A1 | 12/2018 | Gholap et al. | |
| 2019/0065897 A1* | 2/2019 | Li | G06F 18/2415 |
| 2019/0138826 A1* | 5/2019 | Ghafarianzadeh | G06V 20/10 |

FOREIGN PATENT DOCUMENTS

| | | |
|---|---|---|
| CN | 105976393 A | 9/2016 |
| CN | 107492099 A | 12/2017 |

(Continued)

OTHER PUBLICATIONS

Du et al, Review on the Applications of Deep Learning in the Analysis of Gastrointestinal Endoscopy Images, IEEE Access, vol. 7, pp. 142053-142069 (Year: 2019).*

(Continued)

*Primary Examiner* — Ping Y Hsieh
*Assistant Examiner* — Xiao Liu
(74) *Attorney, Agent, or Firm* — ANOVA LAW GROUP PLLC

(57) ABSTRACT

An image analysis method includes: obtaining an image; performing image classification on the image by using an image classification network, to obtain an image classification result of an image category of the image, the image category including a first category and a second category different from the first category; performing object detection on the image by using an object detection network, to obtain an object detection result of a target object associated with the first category; and generating an image analysis result of the image based on the image classification result and the object detection result.

16 Claims, 10 Drawing Sheets

(51) Int. Cl.
    *G06V 10/764*     (2022.01)
    *G06V 10/774*     (2022.01)
    *G06V 10/776*     (2022.01)
    *G06V 10/82*     (2022.01)

(52) U.S. Cl.
    CPC ............ *G06V 10/776* (2022.01); *G06V 10/82* (2022.01); *G06V 2201/03* (2022.01); *G06V 2201/07* (2022.01)

(58) Field of Classification Search
    CPC .. G06V 2201/03; G06V 2201/07; G06N 3/04; G16H 30/00; G06F 18/2415
    See application file for complete search history.

(56) References Cited

FOREIGN PATENT DOCUMENTS

| | | | | |
|---|---|---|---|---|
| CN | 109190540 A | * | 1/2019 | ......... G06K 9/00906 |
| CN | 109359636 A | * | 2/2019 | ............ G06F 16/75 |
| CN | 109544507 A | | 3/2019 | |
| CN | 109961423 A | | 7/2019 | |
| CN | 110110600 A | | 8/2019 | |
| CN | 110110799 A | | 8/2019 | |
| CN | 110119710 A | | 8/2019 | |
| CN | 111461220 A | | 7/2020 | |

OTHER PUBLICATIONS

Wikipedia, Loss function for classification (Year: 2024).*
The World Intellectual Property Organization (WIPO) International Search Report for PCT/CN2021/080185 May 31, 2021 5 Pages (including translation).
Gao Huang et al., "Densely Connected Convolutional Networks," CVPR 2017, pp. 4700-4708. 9 pages.
Joseph Redmon et al., "YOLOv3: An Incremental Improvement," arXiv:1804.02767v1, Apr. 8, 2018. 6 pages.
Kaiming He et al., "Deep Residual Learning for Image Recognition," Computer Vision and Pattern Recognition (CVPR), 2016, pp. 770-778. 9 pages.
Tsung-Yi Lin et al., "Focal Loss for Dense Object Detection," International Conference on Computer Vision (ICCV), 2017, pp. 2980-2988. 9 pages.
Liu Jianping Pinard, "Summary of Intergrated Learning Principles," cnblogs.com, Dec. 4, 2016, Retrieved from the Internet:URL:https://www.cnblogs.com/pinard/p/6131423.html [retrieved on Mar. 18, 2022]. 8 pages.
China National Intellectual Property Administration (CNIPA) Office Action 1 for 202010250222.4 May 31, 2022 10 Pages (including translation).

* cited by examiner

| Layer | Output size | DenseNet-121 |
|---|---|---|
| Convolutional layer | 112×112 | 7×7 convolution (conv), stride 2 |
| Pooling layer | 56×56 | 3×3 maximum pooling, stride 2 |
| Dense block (D1) | 56×56 | $\begin{bmatrix} 1 \times 1 \text{ conv} \\ 3 \times 3 \text{ conv} \end{bmatrix} \times 6$ |
| Transition layer (T1) | 56×56 | 1×1 conv |
| | 28×28 | 2×2 average pooling, stride 2 |
| Dense block (D2) | 28×28 | $\begin{bmatrix} 1 \times 1 \text{ conv} \\ 3 \times 3 \text{ conv} \end{bmatrix} \times 12$ |
| Transition layer (T2) | 28×28 | 1×1 conv |
| | 14×14 | 2×2 average pooling, stride 2 |
| Dense block (D3) | 14×14 | $\begin{bmatrix} 1 \times 1 \text{ conv} \\ 3 \times 3 \text{ conv} \end{bmatrix} \times 24$ |
| Transition layer (T3) | 14×14 | 1×1 conv |
| | 7×7 | 2×2 average pooling, stride 2 |
| Dense block (D4) | 7×7 | $\begin{bmatrix} 1 \times 1 \text{ conv} \\ 3 \times 3 \text{ conv} \end{bmatrix} \times 16$ |
| Classification layer | 1×1 | 7×7 global average pooling |
| | | 2D fully connected, softmax |

FIG. 2

| Batch normalization |
|---|
| ReLu |
| 1×1 convolution (conv) |
| Dropout |
| Batch normalization |
| ReLu |
| 3×3 convolution (conv) |
| Dropout |

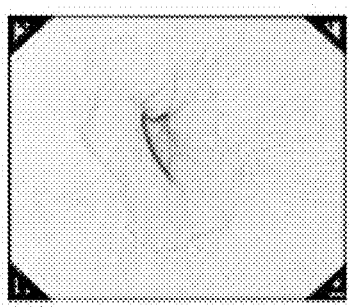
Endoscopic image of
the esophagus
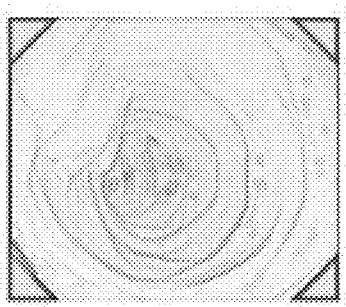
Endoscopic image of
the duodenum
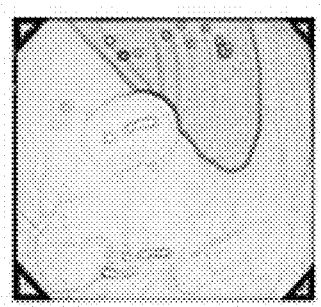
Endoscopic image of
the rectum
Endoscopic image
of the stomach
Endoscopic image
of the throat
FIG. 7A

IMAGE ANALYSIS METHOD, IMAGE ANALYSIS APPARATUS, AND IMAGE ANALYSIS SYSTEM

RELATED APPLICATION(S)

This application is a continuation application of PCT Patent Application No. PCT/CN2021/080185 filed on Mar. 11, 2021, which claims priority to Chinese Patent Application No. 202010250222.4, entitled "IMAGE ANALYSIS METHOD, IMAGE ANALYSIS APPARATUS, AND IMAGE ANALYSIS SYSTEM" filed with the China National Intellectual Property Administration on Apr. 1, 2020, all of which are incorporated herein by reference in entirety.

FIELD OF THE TECHNOLOGY

The present disclosure relates to the technical field of artificial intelligence, and in particular, to an image analysis method, an image analysis apparatus, and an image analysis system.

BACKGROUND

Artificial intelligence (AI) is a theory, method, technology, and application system in which a digital computer or a machine controlled by a digital computer is used to simulate, extend, and expand human intelligence, sense an environment, acquire knowledge, and use the knowledge to obtain an optimal result. In other words, the artificial intelligence is a comprehensive technology of computer science, which attempts to understand essence of intelligence and produces a new intelligent machine that can respond in a manner similar to human intelligence. Artificial intelligence is to study design principles and implementation methods of various intelligent machines, so that the machines have the functions of perception, reasoning, and decision-making.

With the research and progress of artificial intelligence technologies, artificial intelligence technologies are being applied to various fields, such as smart home, smart wearable devices, virtual assistants, smart speakers, intelligent marketing, unmanned driving, autonomous driving, unmanned aircrafts, robots, intelligent healthcare, and intelligent customer service.

The artificial intelligence technology is a comprehensive discipline, covering a wide range of fields, and including both a hardware-level technology and a software-level technology. Basic artificial intelligence technologies generally include technologies such as sensor, dedicated artificial intelligence chip, cloud computing, distributed storage, a big data processing technology, operation/interaction system, and mechatronics. Artificial intelligence software technologies include several directions such as a computer vision technology, a speech processing technology, a natural language processing technology, and machine learning/deep learning.

Machine learning specializes in studying how a computer simulates or implements a human learning behavior to obtain new knowledge or skills, and reorganize an existing knowledge structure, so as to keep improving its performance. The machine learning is often the core of artificial intelligence, is a basic way to make the computer intelligent, and is applied to various fields of artificial intelligence. Various forms of machine learning models have changed many fields of artificial intelligence. For example, machine learning models such as deep neural networks (DNN) are now used in several machine vision tasks.

Fusion of an artificial intelligence technology and a medical technology based on a machine learning model is a topic in implementation of the artificial intelligence technology.

SUMMARY

In one aspect, the present disclosure provides an image analysis method. The image analysis method includes: obtaining an image; performing image classification on the image by using an image classification network, to obtain an image classification result of an image category of the image, the image category including a first category and a second category different from the first category; performing object detection on the image by using an object detection network, to obtain an object detection result of a target object associated with the first category; and generating an image analysis result of the image based on the image classification result and the object detection result.

In another aspect, the present disclosure provides an image analysis apparatus, the apparatus including: a memory storing computer program instructions; and a processor coupled to the memory and configured to execute the computer program instructions and perform: obtaining an image; performing image classification on the image by using an image classification network, to obtain an image classification result indicating an image category of the image, the image category including a first category and a second category different from the first category; performing object detection on the image by using an object detection network, to obtain an object detection result indicating whether a target object associated with the first category is detected; and generating an image analysis result of the image based on the object detection result and the image classification result.

In yet another aspect, the present disclosure provides a non-transitory computer-readable storage medium storing computer program instructions executable by at least one processor to perform: obtaining an image; performing image classification on the image by using an image classification network, to obtain an image classification result of an image category of the image, the image category including a first category and a second category different from the first category; performing object detection on the image by using an object detection network, to obtain an object detection result of a target object associated with the first category; and generating an image analysis result of the image based on the image classification result and the object detection result.

Other aspects of the present disclosure can be understood by those skilled in the art in light of the description, the claims, and the drawings of the present disclosure.

BRIEF DESCRIPTION OF THE DRAWINGS

To facilitate a better understanding of technical solutions of certain embodiments of the present disclosure, accompanying drawings are described below. The accompanying drawings are illustrative of certain embodiments of the present disclosure, and a person of ordinary skill in the art may still derive other drawings from these accompanying drawings without having to exert creative efforts. When the following descriptions are made with reference to the accompanying drawings, unless otherwise indicated, same numbers in different accompanying drawings may represent same or similar elements. In addition, the accompanying drawings are not necessarily drawn to scale.

FIG. 2 is a schematic structure of a DenseNet network (e.g., a DenseNet-121 network) according to some embodiments of the present disclosure;

FIG. 3 is a schematic structure of one (dense block D1) of four dense blocks in a DenseNet-121 network according to some embodiments of the present disclosure;

FIG. 7A is a schematic standard sample according to some embodiments of the present disclosure;

DETAILED DESCRIPTION

Figure 1:
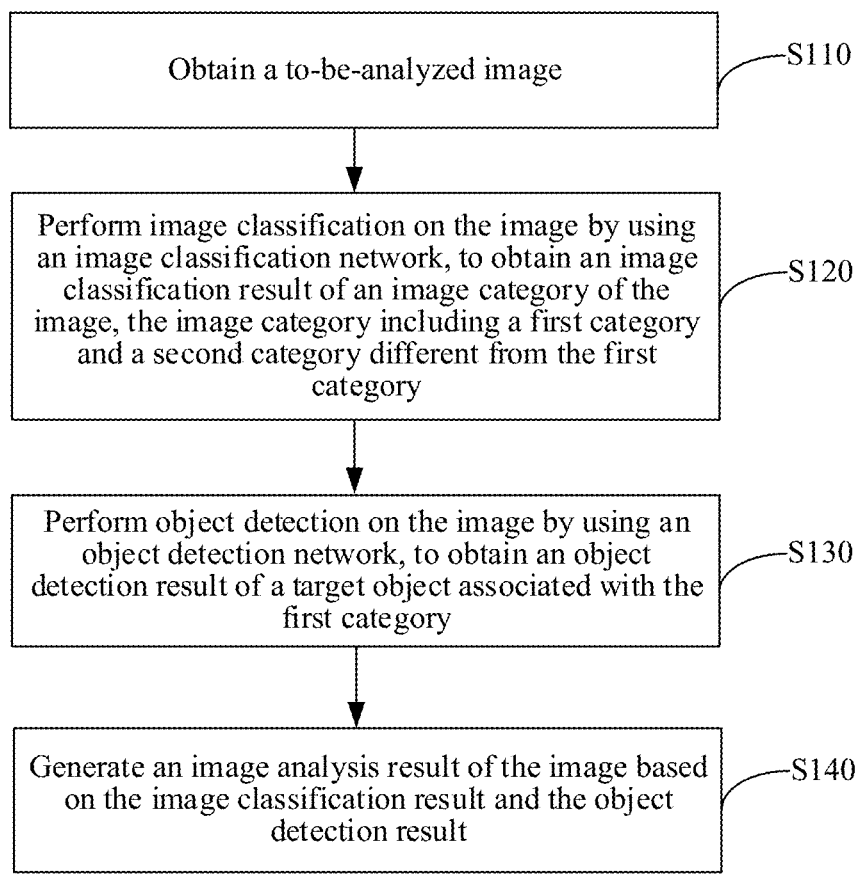
FIG. 1 is a schematic flowchart of an image analysis method according to some embodiments of the present disclosure.

To make objectives, technical solutions, and/or advantages of the present disclosure more comprehensible, certain embodiments of the present disclosure are further elaborated in detail with reference to the accompanying drawings. The embodiments as described are not to be construed as a limitation to the present disclosure. All other embodiments obtained by a person of ordinary skill in the art without creative efforts shall fall within the protection scope of embodiments of the present disclosure.

When and as applicable, the term "an embodiment," "one embodiment," "some embodiment(s), "some embodiments," "certain embodiment(s)," or "certain embodiments" may refer to one or more subsets of all possible embodiments. When and as applicable, the term "an embodiment," "one embodiment," "some embodiment(s), "some embodiments," "certain embodiment(s)," or "certain embodiments" may refer to the same subset or different subsets of all the possible embodiments, and can be combined with each other without conflict.

In certain embodiments, the term "based on" is employed herein interchangeably with the term "according to."

The terms used herein to describe the embodiments of the present are not intended to restrict and/or limit the scope of the present disclosure.

Unless otherwise defined, the technical terms or scientific terms used herein should have general meanings understood by a person of ordinary skill in the field of the present disclosure.

The "first", the "second" and similar terms used in the present disclosure do not indicate any order, quantity or significance, but are used to only distinguish different components. The singular form "one", "a" or "this" does not mean a quantity limitation but means at least one, unless otherwise expressly stated in the context.

A term such as "include" or "comprise" means that an element or an item appearing in front of the term covers an element or an item and equivalents thereof listed behind the term, but does not exclude another element or item. A similar term such as "connect" or "connection" is not limited to a physical or mechanical connection, but may include an electrical connection, whether direct or indirect. "Up", "down", "left", "right", and the like are merely used for indicating relative positional relationships. When absolute positions of described objects change, the relative positional relationships may correspondingly change.

Examples of fusion of an artificial intelligence technology and a medical technology include processing, classification, detection, or analysis of medical images using the artificial intelligence technology.

For example, an endoscopic image diagnosis system based on the artificial intelligence technology is being studied. The endoscopic image diagnosis system may capture (collect) a living tissue image in real time by using an endoscope, and automatically diagnose a lesion location and a lesion category of the living tissue image by using a trained machine learning model. For example, a machine learning model such as a target detection model may be directly used for classifying the living tissue image (a lesion category representing a lesion or a non-lesion category representing no lesion), and to detect a lesion location and a lesion category, thereby assisting a doctor in diagnosis.

The living tissue image is different from a natural image. The lesion and the background are sometimes similar in appearance, and it is difficult to distinguish between them by using naked eyes. In certain embodiment(s), it is difficult to obtain a better effect only by using a single target detection model. In addition, because of a photographing environment and a photographing condition, the endoscope may collect a low-quality image or an unqualified image such as blur, abnormal color, over dark, or over bright. Therefore, by using only a single target detection model, it is easy to make incorrect judgment on an endoscopic image, for example, misreport a normal patient location as a lesion (that is, false positive), which disturbs a user (for example, a doctor).

To at least solve the problem, embodiments of the present disclosure provide an image analysis method, an image analysis apparatus, and an image analysis system.

Certain embodiments of the present disclosure describe a problem that may occur when detecting a living tissue image. Certain embodiments of the present disclosure may also be applied to detecting, classifying, or analyzing a living tissue image. A person skilled in the art is to understand that, for a general image, the method, apparatus, or system provided in the embodiments of the present disclosure may also be used for detection, classification, or analysis.

The following will describe, in detail, the embodiments of the present disclosure referring to the accompanying drawings. The same reference numerals in different accompanying drawings will be used for referring to the same elements that have been described.

In some embodiments of the present disclosure, a living body organization may refer to some components of a living body (an independent individual with a life form that can respond to corresponding external stimuli). For a human body, living tissue includes, for example, an oral cavity, an esophagus, a throat, intestines and stomach (for example, a stomach, a duodenum, or a colorectum), a lung, a heart, or the like of the human body. For an animal, living tissue includes, for example, an oral cavity, an esophagus, a throat, intestines and stomach (for example, a stomach, a duodenum, or a colorectum), a lung, a heart, or the like of the animal.

In some embodiments of the present disclosure, image classification may refer to constructing an image into some type of information.

For example, when or in response to determining that the image is a living tissue image, image classification may refer to determining whether a type of the image is a lesion category representing a lesion or a non-lesion category representing no lesion. Alternatively, image classification may further include determining whether a category of the image is a benign lesion category or a malignant lesion category in a lesion category.

In some embodiments of the present disclosure, image detection (or referred to as object detection) may refer to determining a specific target (or a specific object) in an image and obtaining category information and/or location information of the specific target.

For example, when or in response to determining that the image is a living tissue image, image detection may refer to determining a lesion region of the image. Alternatively, image detection may further include determining whether a lesion category corresponding to the lesion region is a benign lesion category or a malignant lesion category.

FIG. 1 is a flowchart of an image analysis method 100 according to some embodiments of the present disclosure.

Referring to FIG. 1, step S110: obtain a to-be-analyzed image.

In certain embodiment(s), the term "to-be-analyzed image" is interchangeable with the term "image."

In some implementations, the to-be-analyzed image may be received from an image collection apparatus. Alternatively, the to-be-analyzed image may be obtained from a storage apparatus. For example, the image collection apparatus may include a camera or a video camera. For example, the image collection apparatus may include an endoscope on which a camera or a video camera is installed.

In some implementations, a type of the to-be-analyzed image may be a living tissue image.

Step S120: Perform image classification on the image by using an image classification network, to obtain an image classification result of an image category of the image, the image category including a first category and a second category different from the first category. For example, the first category indicates that the image has a target object associated with the first category, and the second category indicates that the image does not have the target object associated with the first category. In an example, the first category (e.g., a lesion category) may indicate that the image includes at least one lesion region, and the second category (e.g., a non-lesion category) may indicate that the image does not include a lesion region.

In some implementations, step S120 may include: determining a confidence level that the image is classified into the first category and a confidence level that the image is classified into the second category; and if the confidence level that the image is classified into the first category is greater than the confidence level that the image is classified into the second category, classifying the image into the first category, and if the confidence level that the image is classified into the first category is less than the confidence level that the image is classified into the second category, determining the image category as the second category.

In some implementations, the first category may include a first sub-category and a second sub-category. In certain embodiment(s), step S120 may include: determining a confidence level that the image is classified into the first sub-category, a confidence level that the image is classified into the second sub-category, and the confidence level that the image is classified into the second category, and determining a category corresponding to the maximum confidence level as the image category of the image. For example, in a specific example, the confidence level that the image is classified into the first sub-category is 0.9, the confidence level that the image is classified into the second sub-category is 0.1, and the confidence level that the image is classified into the second category is 0.1. Because the confidence level that the image is classified into the first sub-category is greater than the confidence level that the image is classified into the second category and the confidence level that the image is classified into the second sub-category, it may be determined that the image category of the image is the first category, and further, it may be determined that the image category of the image is the first sub-category. In the embodiments of the present disclosure, the confidence level used for classification may represent a degree to which the image is classified into a specific category.

Alternatively, step S120 may further include: determining a confidence level that the image is classified into the first sub-category and a confidence level that the image is classified into the second sub-category; determining the maximum confidence level as the confidence level that the image is classified into the first category; determining the confidence level that the image is classified into the second category; and determining a category corresponding to the maximum confidence level of the confidence level of the first category and the confidence level of the second category as the image category of the image. For example, in a specific example, the confidence level that the image is classified into the first sub-category is 0.9, the confidence level that the image is classified into the second sub-category is 0.1, and the confidence level that the image is classified into the second category is 0.1. First, based on the confidence level that the image is classified into the first sub-category is 0.9, and the confidence level that the image is classified into the second sub-category is 0.1, it is determined that the confidence level that the image is classified into the first category is 0.9. Then, based on the confidence level that the image is classified into the first category is 0.9, and the confidence level that the image is classified into the second category is 0.1, it may be determined that the image category of the image is the first category. In addition, the image category of the image may be further determined as the first sub-category. In the embodiments of the present disclosure, the confidence level used for classification may represent a degree to which the image is classified into a specific category.

In an example, the image classification network may implement two kinds of classification to determine whether the image category of the image is the first category or the second category.

In another example, the image classification network may implement three kinds of classification to determine whether the image category of the image is the first sub-category in the first category, the second sub-category in the first category, or the second category.

In some implementations, the image classification result may indicate whether the image category of the image is the first category or the second category. For example, the image classification result may include information indicating whether the image category of the image is the first category or the second category.

In some implementations, the image classification result may indicate whether the image category of the image is the first category or the second category, and further indicates whether the image category of the image is the first sub-category, the second sub-category, or the second category. For example, the image classification result may include information indicating whether the image category of the image is the first category or the second category, or may include information indicating whether the image category of the image is the first sub-category, the second sub-category, or the second category.

In certain embodiment(s), the image classification result may include indication information to indicate whether the image category of the image is the first category or the second category. In an example, the indication information may be an indicator. For example, when a value of the indicator is "0", the image category of the image may be indicated as the first category, and when the value of the indicator is "1", the image category of the image may be indicated as the second category. In another example, the indication information may be text information indicating whether the image category of the image is the first category or the second category.

In some implementations, the image classification result may further include information about a confidence level that the image is classified into a corresponding category. For example, the image classification result may include at least one of the confidence level that the image is classified into the first category and the confidence level that the image is classified into the second category.

In some implementations, when or in response to determining that the type of the to-be-analyzed image is a living tissue image, the first category is a lesion category, and the second category is a non-lesion category (that is, a normal category). For example, the lesion category may include a first sub-category (benign lesion category) and a second sub-category (malignant lesion category (e.g., a cancer category)).

In some implementations, the image classification network may be implemented as a machine learning model such as a deep neural network (e.g., a convolutional neural network (CNN)). For example, the image classification network may include a neural network classifier based on, for example, a DenseNet network (see Gao Huang, et al. "Densely Connected Convolutional Networks", IEEE Conference on Computer Vision and Pattern Recognition (CVPR), 2017) or a ResNet network (see Kaiming He, et al. "Deep Residual Learning for Image Recognition", IEEE Conference on Computer Vision and Pattern Recognition (CVPR), 2016). The DenseNet network is a densely connected convolutional neural network that connects each layer to each of other layers in a feedforward manner. FIG. 2 illustrates an example structure of a DenseNet network (e.g., a DenseNet-121 network). Referring to FIG. 2, the DenseNet-121 network may include a convolutional layer, a pooling layer, four dense blocks (dense blocks D1, D2, D3, and D4), three transition layers (transition layers T1, T2, and T3), and a classification layer. For example, a growth rate of the DenseNet-121 network, that is, a quantity of features added at each layer, may be set to 24. FIG. 2 shows a structure and a parameter of each layer. Referring to FIG. 2, the convolutional layer includes 7×7 convolution (cony) and a stride is 2. The pooling layer includes a 3×3 maximum pool (max pool) (a stride is 2). The transition layer includes 1×1 convolution (cony) and 2×2 average pooling (a stride is 2). For example, a feature compression ratio of the transition layer may be set to 0.5. The classification layer includes 7×7 global average pooling, a two-dimensional (2D) fully connected, and softmax. In addition, FIG. 3 illustrates an example structure of one (dense block D1) of four dense blocks. Referring to FIG. 3, the dense block D1 may include six same processing processes, and the processing process includes two batch normalization, two ReLu activation functions, 1×1 convolution (Cony), 3×3 convolution (cony), and two dropout processing.

Although an example structure of the DenseNet network (e.g., the DenseNet-121 network) that may implement the image classification network is described above, the embodiments of the present disclosure are not limited thereto. For example, various other machine learning models may be used for implementing the image classification network to classify the to-be-analyzed image.

Then, referring to FIG. 1, step S130: Perform object detection on the image by using an object detection network, to obtain an object detection result of a target object associated with the first category.

In some implementations, the object detection result may include information indicating whether the target object associated with the first category is detected.

In certain embodiment(s), the object detection result may include indication information to indicate whether the target object associated with the first category is detected. In an example, the indication information may be an indicator. For example, when a value of the indicator is "0", it may indicate that information of the target object associated with the first category is not detected, and when the value of the indicator is "1", it may indicate that the information of the target object associated with the first category is detected.

In certain embodiment(s), when or in response to determining that the object detection network detects the target object, the object detection result may include the information about the detected target object. For example, the information about the detected target object may include at least one of a location of the target object (for example, coordinates of a vertex), a size of the target object (for example, a length and a width), or a category of the target object. In certain embodiment(s), that the target object associated with the first category and at least one of the location, size, or category of the target object are detected may be indicated by using the information about the detected target object in the object detection result.

In certain embodiment(s), when or in response to determining that the object detection network does not detect the target object associated with the first category, the object detection result may include specific information indicating that the target object associated with the first category is not detected. In an example, the specific information may be the original to-be-analyzed image to indicate that the target object associated with the first category is not detected. In another example, the specific information may be a null value to indicate that the target object associated with the first category is not detected.

In certain embodiment(s), when or in response to determining that the first category includes a first sub-category and a second sub-category, the object detection result may further include information indicating whether the category of the target object is the first sub-category or the second sub-category.

Figure 4A:
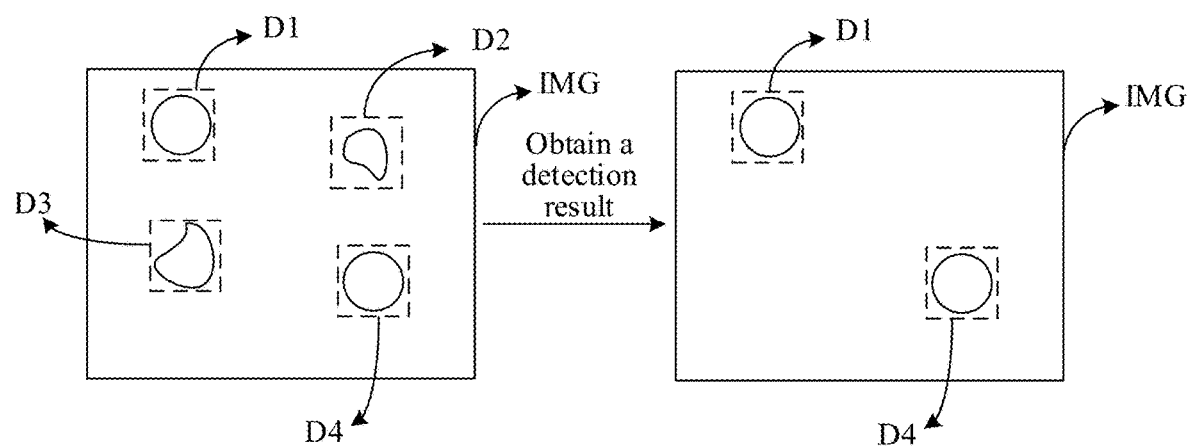
FIG. 4A and FIG. 4B are schematic diagrams of detection performed by an object detection network on an image according to some embodiments of the present disclosure.
Figure 4B:
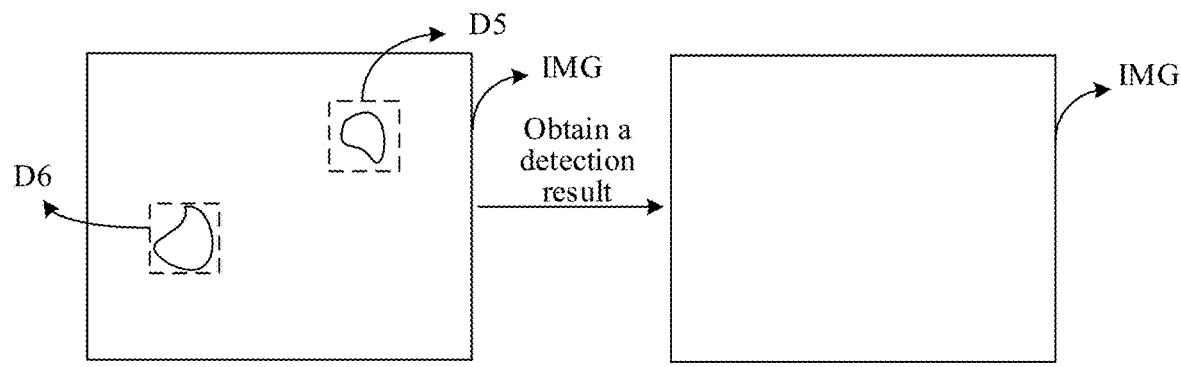

In some implementations, step S130 may include: determining whether a candidate region is identified in the image; when or in response to determining that no candidate region is identified, the object detection result may include information indicating that the target object associated with the first category is not detected; when or in response to determining that at least one candidate region is identified, determining, according to a preset detection threshold, whether the at least one candidate region is a target object; when or in response to determining that candidate regions in the at least one candidate region are not target objects, the object detection result may include information indicating that the target object associated with the first category is not detected; and when or in response to determining that at least one candidate region in the at least one candidate region is a target object, the object detection result may include information indicating that the target object associated with the first category is detected. For example, when or in response to determining that a detection confidence level of a corresponding candidate region is greater than the preset detection threshold, the candidate region is determined as the detected target object, and when or in response to determining that the detection confidence level of the corresponding candidate region is less than the preset detection threshold, the candidate region is not determined as the detected target object. That is, if detection confidence levels of candidate regions are less than the preset detection threshold, it may be determined that the target object associated with the first category is not detected. In certain embodiment(s), the object detection result may include information about the candidate region (for example, location information and a corresponding detection confidence level) in addition to the information indicating that the target object associated with the first category is not detected. In the embodiments of the present disclosure, the detection confidence level may represent a confidence level that a specific region is identified as a target object. With reference to FIG. 4A and FIG. 4B, the following describes a specific example of object detection performed on an image by using an object detection network.

Referring to FIG. 4A, the object detection network detects an image IMG, and may identify a plurality of candidate regions in corresponding detection boxes (D1, D2, D3, and D4). Each candidate region has a detection confidence level corresponding to the candidate region. For example, assuming that a confidence level that the candidate region in the detection box D1 is identified as the first category is 0.98, a confidence level that the candidate region in the detection box D2 is identified as the first category is 0.2, a confidence level that the candidate region in the detection box D3 is identified as the first category is 0.1, a confidence level that the candidate region in the detection box D4 is identified as the first category is 0.92, and a preset detection threshold is 0.9, the candidate regions in the detection boxes D1 and D4 are determined as target objects. In certain embodiment(s), the object detection result may include information indicating that the target object associated with the first category is detected. For example, the information may include information about the detected target object (i.e., the regions in the detection boxes D1 and D4) (e.g., location information or a corresponding detection confidence level). In an example, the location of the target object may be indicated in the object detection result by using the corresponding detection boxes D1 and D4 on the image IMG. For various forms of the object detection result, refer to various implementations described above.

Referring to FIG. 4B, the object detection network detects the image IMG, and may identify a plurality of candidate regions in corresponding detection boxes (D5 and D6). Each candidate region has a detection confidence level corresponding to the candidate region. For example, assuming that a confidence level that the candidate region in the detection box D5 is identified as the first category is 0.2, a confidence level that the candidate region in the detection box D6 is identified as the first category is 0.1, and the preset detection threshold is 0.9, it may be determined that the target object associated with the first category is not detected. In certain embodiment(s), the object detection result may include information indicating that the target object associated with the first category is not detected. For various forms of the object detection result, refer to various implementations described above.

Figure 5:
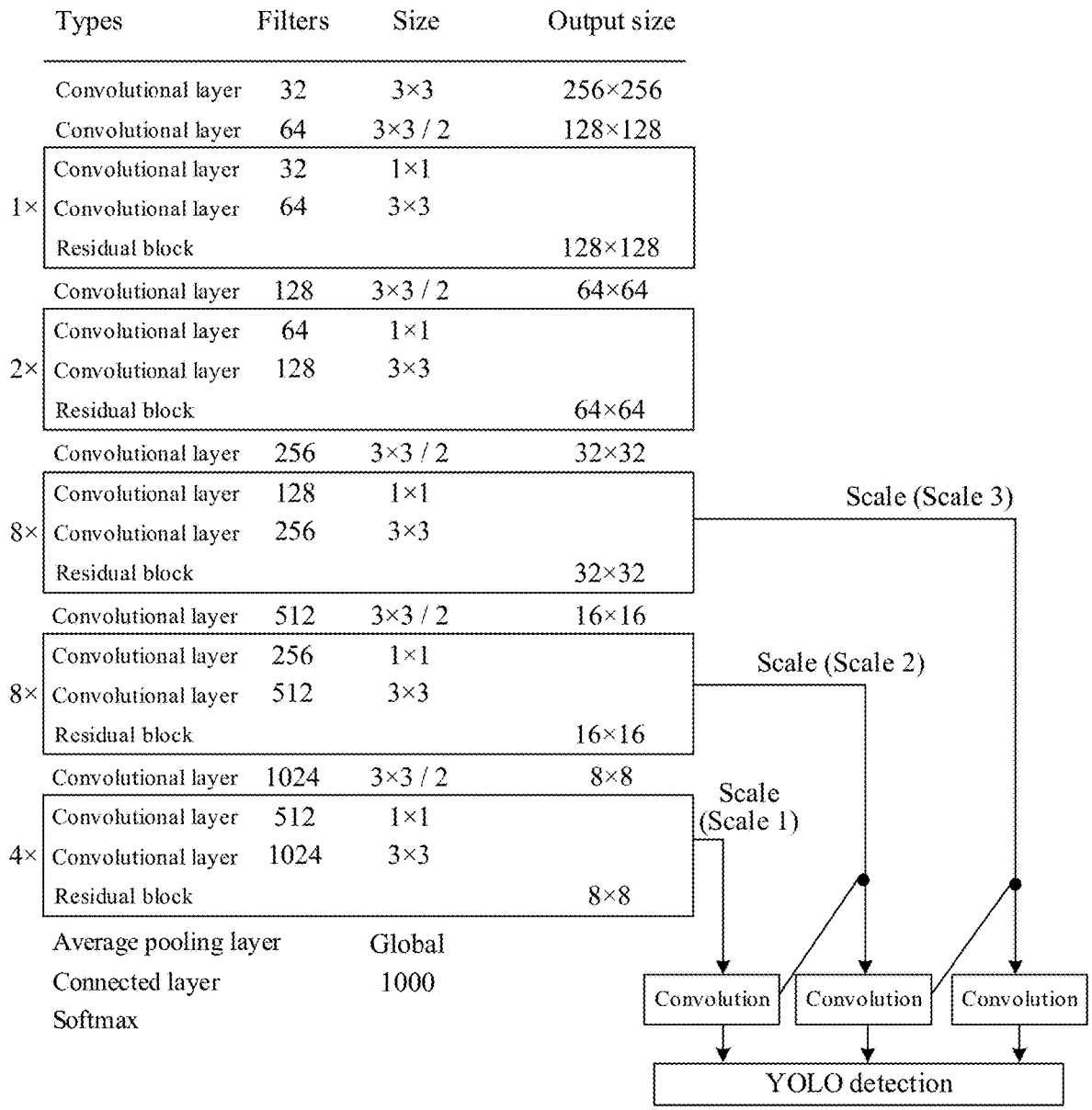
FIG. 5 is a schematic structure of a Darknet-53-based YOLOv3 network according to some embodiments of the present disclosure.

In some implementations, the object detection network may be implemented as a machine learning model such as a deep neural network (e.g., a convolutional neural network (CNN)). For example, the object detection network may include a YOLOv3 network (see Joseph Redmon, et al. "YOLOv3: An Incremental Improvement", 2018) or various detection networks of a RetinaNet network (see, Tsung-Yi Lin, et al. "Focal Loss for Dense Object Detection", IEEE Transactions on Pattern Analysis and Machine Intelligence, 2017). The YOLOv3 network uses a multi-scale training method and performs detection based on an anchor box. FIG. 5 illustrates an example structure of a Darknet-53-based YOLOv3 network according to some embodiments of the present disclosure. Referring to FIG. 5, the Darknet-53-based YOLOv3 network may include a plurality of (e.g., 52 in FIG. 5) convolutional layers, a plurality of residual blocks, an average pooling layer, a connection layer (e.g., by 1×1 convolution), and softmax. Still referring to FIG. 5, the YOLOv3 network performs detection (YOLO detection) in a manner of multi-scale (Scale1, Scale2, and Scale3) fusion.

Although the example structure of the YOLOv3 network that can implement the object detection network is described above, the embodiments of the present disclosure are not limited thereto. For example, the object detection network may be implemented using any suitable machine learning model to perform target detection or object detection on the to-be-analyzed image.

Next, still referring to FIG. 1, step S140: Generate an image analysis result of the image based on the image classification result and the object detection result.

In some implementations, step S140 may include: When or in response to determining that the image classification result indicates that the image category is the first category and the object detection result indicates that the target object related to the first category is detected, it may be determined that the image has the target object, and it may be indicated, by using the image analysis result, that the image has the target object; and when or in response to determining that the image classification result indicates that the image category is the second category and the object detection result indicates that the target object is not detected, it may be determined that the image does not have the target object, and it may be indicated, by using the image analysis result, that the image does not have the target object.

In some implementations, step S140 may include: comparing the first confidence level with a first threshold when or in response to determining that the image classification result indicates that the image category is the second category and the object detection result indicates that the target object is detected, the first confidence level indicating a confidence level that the image is classified into the second category; determining that the image has the target object and indicating, by using the image analysis result, that the image has the target object, when or in response to determining that the first confidence level is less than or equal to the preset first threshold; and determining that the image does not have the target object, and indicating, by using the image analysis result, that the image does not have the target object, when or in response to determining that the first confidence level is greater than the preset first threshold.

In certain embodiment(s), the image analysis result may include indication information to indicate whether the image has the target object associated with the first category. In an example, the indication information may be an indicator. For example, when a value of the indicator is "0", it may indicate that the image does not have information about the target object associated with the first category, and when the value of the indicator is "1", it may indicate that the image has information about the target object associated with the first category. In another example, the indication information may alternatively be other information (for example, text information) indicating that the image has the target object.

In certain embodiment(s), when the image analysis result indicates that the image has the target object, the image analysis result may include at least one of the information about the target object (e.g., a location of the target object (e.g., coordinates of a vertex), a size of the target object (e.g., a length and a width), a category of the target object, or a detection confidence level of the target object). When or in response to determining that a quantity of target objects is greater than one, the image analysis result may include information about each target object. In an example, the image analysis result may include an image in which a target object is marked (e.g., by a corresponding detection box). In certain embodiment(s), the image in which the target object is marked may be used for indicating that the image has the target object and the corresponding location of the target object. For example, In certain embodiment(s), the image analysis result may include an image in which a target object is marked by using a detection box.

In certain embodiment(s), the image analysis result may include indication information (e.g., an indicator) indicating whether the image has the target object associated with the first category, and the information about the target object (e.g., the location of the target object (e.g., coordinates of the vertex), the size of the target object (e.g., the length and the width), the category of the target object, or the detection confidence level of the target object).

In certain embodiment(s), when the image analysis result indicates that the image does not have the target object, the image analysis result may include specific information to indicate that the image does not have the target object associated with the first category. In an example, the specific information may be the original to-be-analyzed image, that is, there is no target object identified by the detection box. In another example, the specific information may be a null value to indicate that the image does not have the target object associated with the first category.

In some implementations, step S140 may include: comparing a second confidence level with a second threshold when or in response to determining that the image classification result indicates that the image category is the first category and the object detection result indicates that the target object is not detected, the second confidence level indicating a confidence level that the image is classified into the first category; and when or in response to determining that the second confidence level is greater than the second threshold, the image analysis result indicates that the image has the target object, and when or in response to determining that the second confidence level is less than or equal to the second threshold, the image analysis result indicates that the image does not have the target object.

Certain embodiment(s) of the present disclosure describes various analysis policies for generating the image analysis result of the image based on the image classification result and the object detection result in step S140. The following describes an implementation of generating an image analysis result based on at least one of these policies with reference to FIG. 6.

Figure 6:
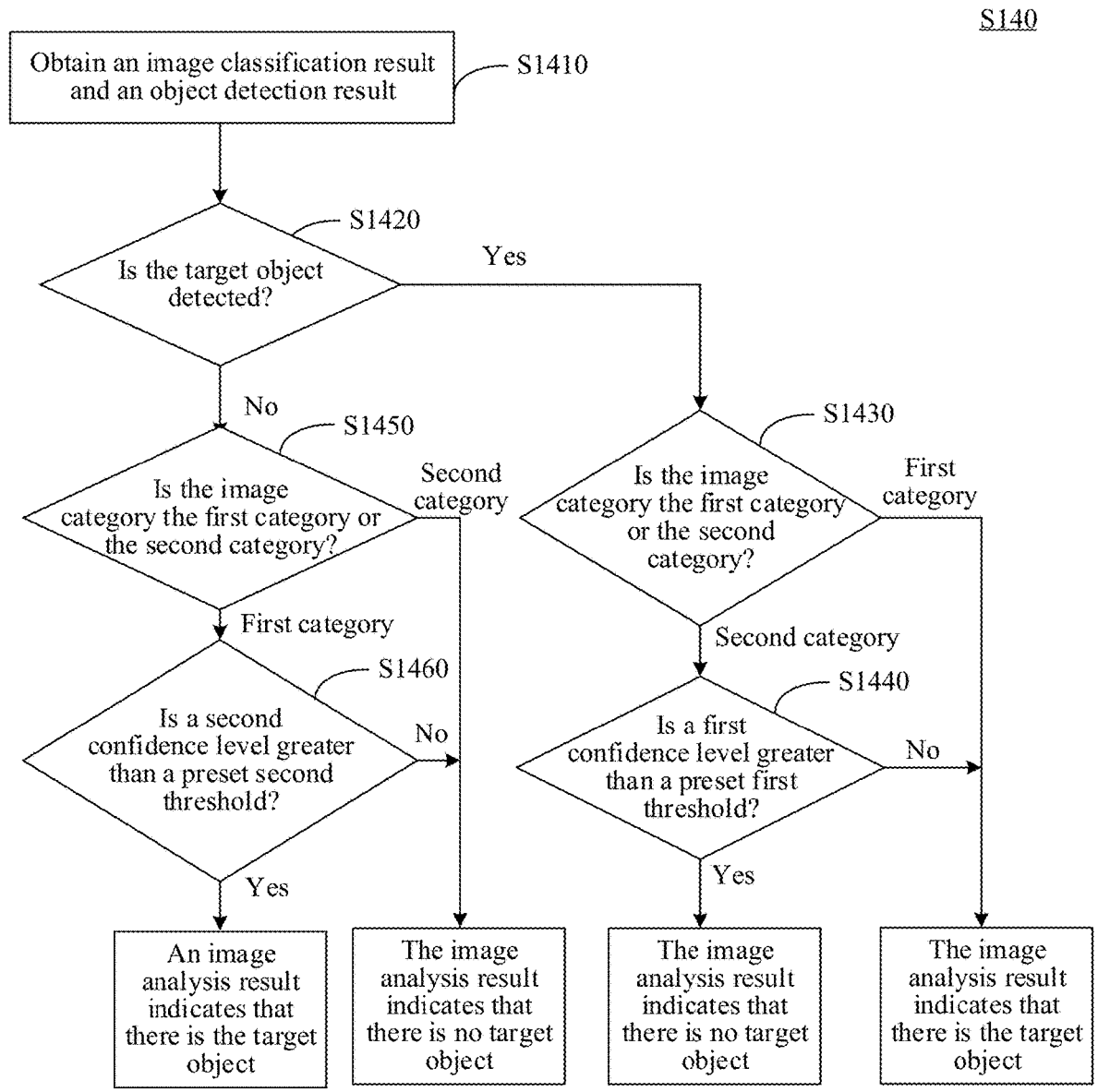
FIG. 6 is a schematic flowchart of a method for generating an image analysis result of an image based on an image classification result and an object detection result according to some embodiments of the present disclosure.

Referring to FIG. 6, step S1410: Obtain an image classification result and an object detection result.

For example, an image classification result of an image (e.g., a living tissue image) may be received from an image classification network, and an object detection result is obtained from an object detection network.

Then, step S1420: Determine, based on the object detection result, whether a target object is detected (for example, a lesion region corresponding to a lesion category).

When the object detection result indicates that the target object (e.g., the lesion region) is detected in step S1420, in step S1430: Determine, based on the image classification result, whether an image category is a first category (e.g., a lesion category) or a second category (e.g., a non-lesion category).

If it is determined in step S1430 that the image category is the first category (e.g., the lesion category), information indicating that the image (e.g., the living tissue image) has the target object (e.g., the lesion region) may be included in an image analysis result. On the contrary, if it is determined that the image category is the second category (e.g., the non-lesion category), in step S1440: Determine whether a first confidence level is greater than a preset first threshold, the first confidence level representing a confidence level that the image is classified into the second category (e.g., the non-lesion category). If it is determined that the first confidence level is greater than the preset first threshold, it may be considered that the confidence level that the image (e.g., the living tissue image) is classified into the second category (e.g., the non-lesion category) is high, and the image analysis result may include information indicating that the image (e.g., the living tissue image) does not have the target object (e.g., the lesion region). On the contrary, if it is determined that the first confidence level is less than or equal to the preset first threshold, it is considered that the confidence level that the image (e.g., the living tissue image) is classified into the second category (for example, the non-lesion category) is low, and the image analysis result may include information indicating that the image (e.g., the living tissue image) has the target object (e.g., the lesion region). For various forms of the image analysis result, refer to various implementations described above. Therefore, the object detection result may be adjusted based on the confidence level used for image classification.

When the object detection result indicates that the target object is not detected in step S1420, in step S1450: Determine whether the image category is the first category (e.g., the lesion category) or the second category (e.g., the non-lesion category).

If it is determined in step S1450 that the image category is the second category (e.g., the non-lesion category), the image analysis result includes information indicating that the image does not have the target object (e.g., the lesion region). On the contrary, if it is determined in step S1450 that the image category is the first category (e.g., the lesion category), in step S1460: Determine whether a second confidence level is greater than a preset second threshold, the second confidence level representing a confidence level that the image (e.g., the living tissue image) is classified into the first category (e.g., the lesion category). If it is determined that the second confidence level is greater than the preset second threshold, it may be determined that the confidence level that the image (e.g., the living tissue image) is classified into the first category (e.g., the lesion category) is high, and the image analysis result may include information indicating that the image (e.g., the living tissue image) has the target object (e.g., the lesion region). In certain embodiment(s), the target object may be determined as a first candidate region (for example, a candidate lesion region) corresponding to the maximum detection confidence level in a plurality of detection confidence levels in performing object detection on the image by using the object detection network. For example, in a specific example, referring to FIG. 4B, the image analysis results may include information about the first candidate region (e.g., a region within the detection box D5) corresponding to the maximum detection confidence level of the plurality of detection confidence levels (e.g., a location of the first candidate region (e.g., coordinates of a vertex), a size (e.g., a length and a width), a category, or a detection confidence level). In addition, if it is determined that the second confidence level is less than or equal to the preset second threshold, the image analysis result may include information indicating that the image (e.g., the living tissue image) does not have the target object (e.g., the lesion region).

In some implementations, the first category (e.g., the lesion category) may include a first sub-category (e.g., a benign lesion category) and a second sub-category (e.g., a malignant lesion category). In certain embodiment(s), depending on whether the first category is the first sub-category (e.g., the benign lesion category) or the second sub-category (e.g., the malignant lesion category), some of the analysis policies in the embodiments may be changed or adjusted. The following describes some examples.

In an example, for example, in step S1450, if it is determined that the image category is the first category (e.g., the lesion category), it is further determined whether the image category is the first sub-category (e.g., the benign lesion category) or the second sub-category (e.g., the malignant lesion category) in the first category. If it is determined that the image category is the second sub-category (for example, the malignant lesion category), it may be directly determined that the image has the target object without performing step S1460. In certain embodiment(s), the target object may be determined as a candidate region (e.g., a candidate lesion region corresponding to the malignant lesion category) when or in response to determining that the object detection network is used for image detection. For example, the image analysis result may include information about the candidate region (e.g., at least one of the location (e.g., the coordinates of the vertex), the size (e.g., the length and the width), the category, or the detection confidence level of the candidate region).

In another example, for example, in step S1450, if it is determined that the image category is the first category (e.g., the lesion category), it is further determined whether the image category is the first sub-category (e.g., the benign lesion category) or the second sub-category (e.g., the malignant lesion category) in the first category. Then, in step S1460, it is determined whether the second confidence level is greater than the preset second threshold, the second confidence level representing a confidence level that the image (e.g., the living tissue image) is classified into the first category (e.g., the lesion category) (including the first sub-category (e.g., the benign lesion category) or the second sub-category (e.g., the malignant lesion category)). In certain embodiment(s), the image analysis result may include information indicating that the image (e.g., the living tissue image) has the target object (e.g., the lesion region), and at least one of a second candidate region and a third candidate region may be determined as the target object, the second candidate region corresponding to the maximum detection confidence level of a plurality of detection confidence levels associated with the first sub-category (e.g., the benign lesion category), and the third candidate region corresponding to the maximum detection confidence level of a plurality of detection confidence levels associated with the second sub-category (e.g., the malignant lesion category). For example, the image analysis result may include at least one of information about the second candidate region (e.g., at least one of a location of the second candidate region (e.g., coordinates of a vertex), a size (e.g., a length and a width), a category, and a detection confidence level), and information about the third candidate region (e.g., at least one of a location of the third candidate region), a size (e.g., a length and a width), a category, and a detection confidence level). In an example, the image analysis result may include an image in which the target object is marked (for example, by using at least one of a detection box corresponding to the second candidate region and a detection box corresponding to the third candidate region).

In the embodiments of the present disclosure, the preset detection threshold, the preset first threshold, and the preset second threshold may be preset hyperparameters. For example, values of these hyperparameters may be set according to a detection task used for the object detection network.

In some implementations, the method 100 may further include some additional steps. For example, before step S110 or step S120, the method further includes: training at least one of the image classification network or the object detection network.

Figure 7B:
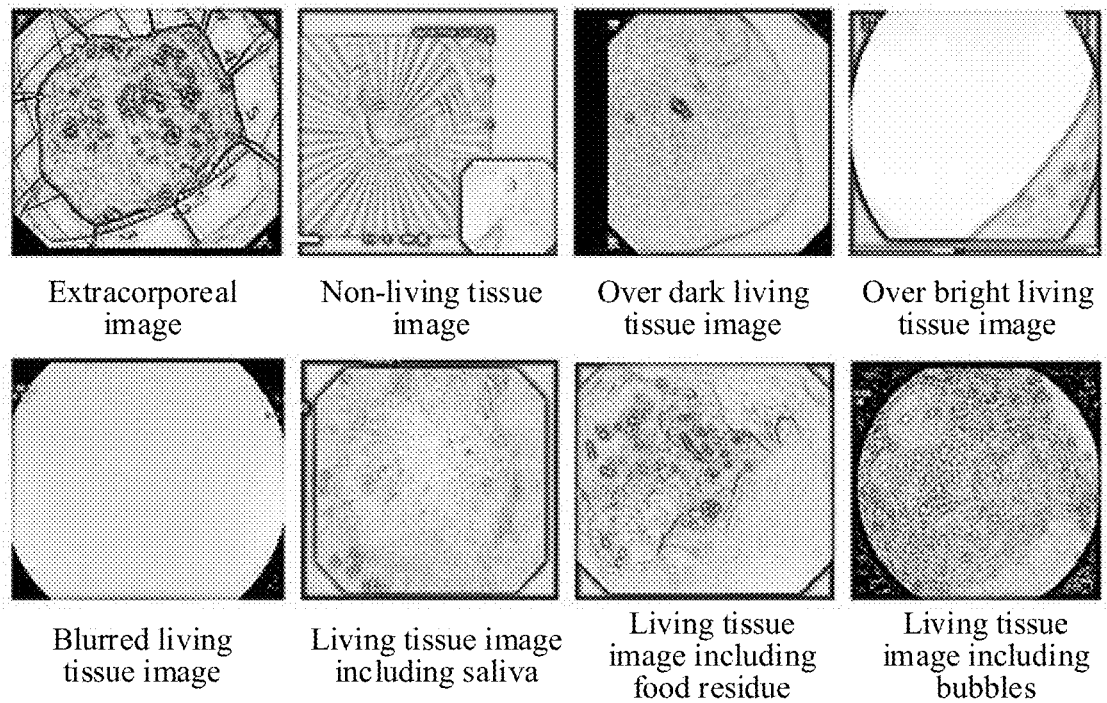
FIG. 7B is a schematic interference sample according to some embodiments of the present disclosure.

In certain embodiment(s), training at least one of the image classification network or the object detection network includes: obtaining a training dataset, the training dataset including at least one standard sample and at least one interference sample; annotating a category of the at least one standard sample and a category of the at least one interference sample to obtain a first annotation sample set; and annotating the target object of the at least one standard sample and the target object of the at least one interference sample to obtain a second annotation sample set, so as to train the image classification network by using the first annotation sample set, and train the object detection network by using the second annotation sample set. In the embodiments of the present disclosure, the standard sample may refer to an image sample with relatively high quality, and an interference sample may refer to an image sample with relatively low quality. For example, when or in response to determining that the type of the to-be-analyzed image is a living tissue image (e.g., acquired by an endoscope), FIG. 7A shows examples of some standard samples, and FIG. 7B shows examples of some interference samples. In FIG. 7A, endoscopic images of different organs (e.g., esophagus, stomach, duodenum, colon or throat) have relatively high quality, so that the image classification network or the object detection network can classify or detect them. In FIG. 7B, images such as extracorporeal images, non-living tissue images, over dark living tissue images, over bright living tissue images, blurred living tissue images, living tissue images including saliva, living tissue images including food residue, or living tissue images including bubbles belong to image samples with relatively low quality, and these images belong to the non-lesion category. In some embodiments of the present disclosure, by including, in a training dataset, an image sample with relatively low quality that belongs to the non-lesion category, the image classification network or the object detection network can be improved to recognize a low-quality image, thereby reducing a false positive problem caused by quality deficiency of the to-be-analyzed image.

In certain embodiment(s), when the object detection network is trained, the object detection network is initialized using parameters trained by using an ImageNet dataset based on a transfer learning technology. The ImageNet dataset is an open source dataset in the computer vision field with a data volume of over one-million-level. A model initial point is obtained through the dataset, thereby avoiding overfitting of the object detection network, so that the object detection network can easily converge to an optimal point, that is, has better convergence.

Certain embodiment(s) of the present disclosure describes the image analysis method 100 according to some embodiments of the present disclosure. In this embodiment of the present disclosure, target detection of the image is performed by combining the image classification result from the image classification network and the object detection result from the object detection network, to generate the image analysis result for the image, and network parameters of the image classification network and the object detection network can be adjusted according to the corresponding image analysis result, so as to implement image analysis, thereby improving precision of target detection.

For example, the image analysis method 100 may be used for analyzing a living tissue image. In certain embodiment(s), the first category is a lesion category, the second category is a non-lesion category (i.e., a normal category), and the target object is a lesion region corresponding to the lesion category. For example, the lesion category may include a benign lesion category or a malignant lesion category. By using the image analysis method 100 according to some embodiments of the present disclosure, precision of detecting a lesion region can be improved, and a false positive problem can be avoided.

For example, the method according to the embodiments of the present disclosure is compared with a method for object detection using only a detection model, and effect evaluation is performed on a dataset including more than 10,000 image samples. Evaluation indexes commonly used in a machine learning model are precision, recall, and F-Measure. The precision may represent a proportion of image samples correctly predicted in the image samples in the dataset, the recall may represent a proportion of positive image samples correctly predicted in the positive image samples in the dataset, and F-Measure may represent weighted averaging of precision and recall. Table 1 shows comparison of effects of object detection using the method according to the embodiments of the present disclosure with object detection using only a detection model, and Table 1 shows evaluation of effects of the method of the embodiments according to the present disclosure and a method using only a detection model.

TABLE 1

| Method | Precision | Recall | F-Measure |
| --- | --- | --- | --- |
| Method using only the detection model | 77.59% | 55.71% | 64.86% |
| Method according to the embodiments of the present disclosure | 83.80% | 55.13% | 66.51% |

As shown in Table 1, precision of the method according to the embodiments of the present disclosure is significantly improved, recall is reduced to a certain degree, and F-Measure is improved to a certain degree. Thus, the method according to the embodiments of the present disclosure has better detection performance.

Figure 8:
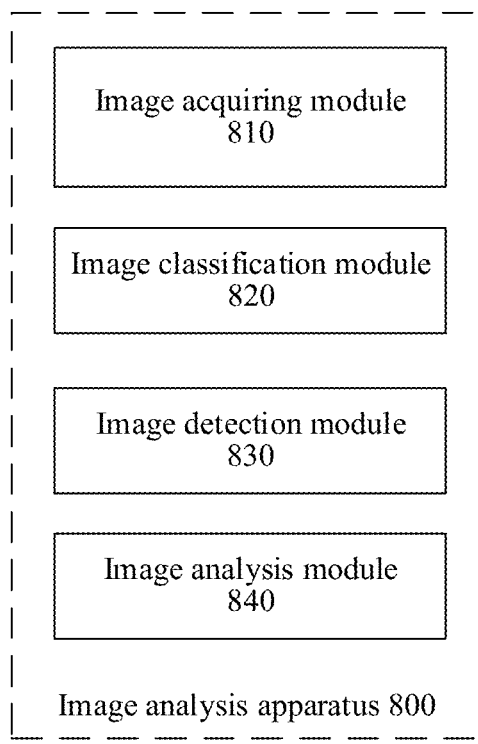
FIG. 8 is a schematic block diagram of an image analysis apparatus according to some embodiments of the present disclosure.

The following describes an image analysis apparatus 800 according to some embodiments of the present disclosure with reference to FIG. 8.

FIG. 8 is a block diagram of an image analysis apparatus 800 according to some embodiments of the present disclosure.

Referring to FIG. 8, the image analysis apparatus 800 may include an image acquiring module 810, an image classification module 820, an image detection module 830, and an image analysis module 840.

The image acquiring module 810 is configured to obtain a to-be-analyzed image.

The image classification module 820 is configured to: perform image classification on the image by using an image classification network, to obtain an image classification result indicating an image category of the image, the image category including a first category and a second category different from the first category.

The image detection module 830 is configured to: perform object detection on the image by using an object detection network, to obtain an object detection result indicating whether a target object associated with the first category is detected.

The image analysis module 840 is configured to: generate an image analysis result of the image based on the object detection result and the image classification result.

For various configurations of the image acquiring module 810, the image classification module 820, the image detection module 830, and the image analysis module 840, refer to the described method embodiments.

Certain embodiment(s) of the present disclosure describes the image analysis apparatus 800 according to some embodiments of the present disclosure. In some embodiments of the present disclosure, the image analysis apparatus 800 performs target detection of the image by combining the image classification result from the image classification network and the object detection result from the object detection network, to generate the image analysis result for the image, and can adjust network parameters of the image classification network and the object detection network according to the corresponding image analysis result, so as to reduce image misdiagnosis caused by using a single object detection network, thereby implementing image analysis, and improving precision.

For example, the image analysis apparatus 800 may be configured to analyze a living tissue image. In certain embodiment(s), the first category is a lesion category, the second category is a non-lesion category (i.e., a normal category), and the target object is a lesion region corresponding to the lesion category. For example, the lesion category may include a benign lesion category or a malignant lesion category. By using the image analysis apparatus 800 according to some embodiments of the present disclosure, precision of detecting a lesion region can be improved, and a false positive problem can be avoided.

Figure 9:
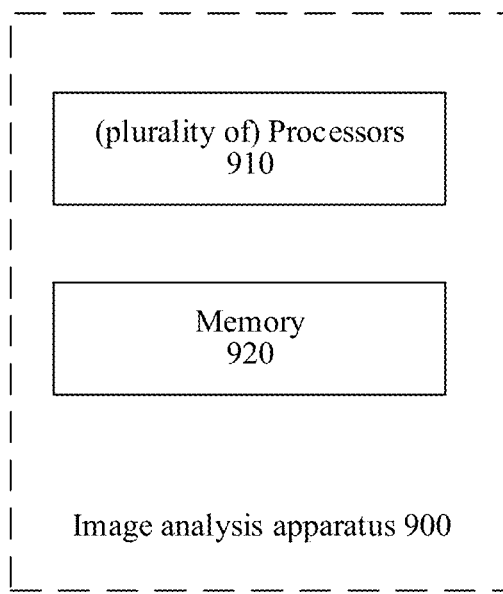
FIG. 9 is a schematic block diagram of an image analysis apparatus according to some embodiments of the present disclosure.

The following describes an image analysis apparatus 900 according to some embodiments of the present disclosure with reference to FIG. 9.

FIG. 9 is a block diagram of an image analysis apparatus 900 according to some embodiments of the present disclosure.

Referring to FIG. 9, the image analysis apparatus 900 may include at least one processor 910 and a memory 920. The memory 920 may be configured to store at least one computer program. When executed by the at least one processor 910, the at least one computer program implements: obtaining a to-be-analyzed image; performing image classification on the image by using an image classification network, to obtain an image classification result indicating an image category of the image, the image category including a first category and a second category different from the first category; performing object detection on the image by using an object detection network, to obtain an object detection result indicating whether a target object associated with the first category is detected; and generating an image analysis result of the image based on the object detection result and the image classification result.

The processor 910 may include various processing circuits, such as but not limited to one or more of a dedicated processor, a central processing unit, an application processor, or a communications processor. The processor 910 may control and/or perform communications-related operations or data processing on at least one other component of the image analysis apparatus 900.

The memory 920 may include a volatile and/or non-volatile memory.

In some implementations, when the at least one computer program is executed by the at least one processor 910, the at least one processor 910 implements some or all of the methods in the embodiments of the present disclosure described above.

For example, the image analysis apparatus 900 in this embodiment of the present disclosure may include a smartphone, a tablet personal computer (PC), a server, a mobile phone, a video phone, an e-book reader, a desktop PC, a laptop computer, a netbook computer, a personal digital assistant (PDA), a portable multimedia player (PMP), an MP3 player, a mobile medical device, a camera, or a wearable device (for example, a head-mounted device (HMD), electronic clothes, an electronic wristband, an electronic necklace, an electronic finisher, an electronic jewelry, an electronic tattoo, or a smart watch).

Certain embodiment(s) of the present disclosure describes the image analysis apparatus 900 according to some embodiments of the present disclosure. In some embodiments of the present disclosure, the image analysis apparatus 900 performs target detection of the image by combining the image classification result from the image classification network and the object detection result from the object detection network, to generate the image analysis result for the image, and can adjust network parameters of the image classification network and the object detection network according to the corresponding image analysis result, thereby implementing image analysis, and improving precision.

For example, the image analysis apparatus 900 is configured to analyze a living tissue image. In certain embodiment(s), the first category is a lesion category, the second category is a non-lesion category (i.e., a normal category), and the target object is a lesion region corresponding to the lesion category. For example, the lesion category may include a benign lesion category or a malignant lesion category. By using the image analysis apparatus 900 according to some embodiments of the present disclosure, precision of detecting a lesion region can be improved, and a false positive problem can be avoided.

Figure 10:
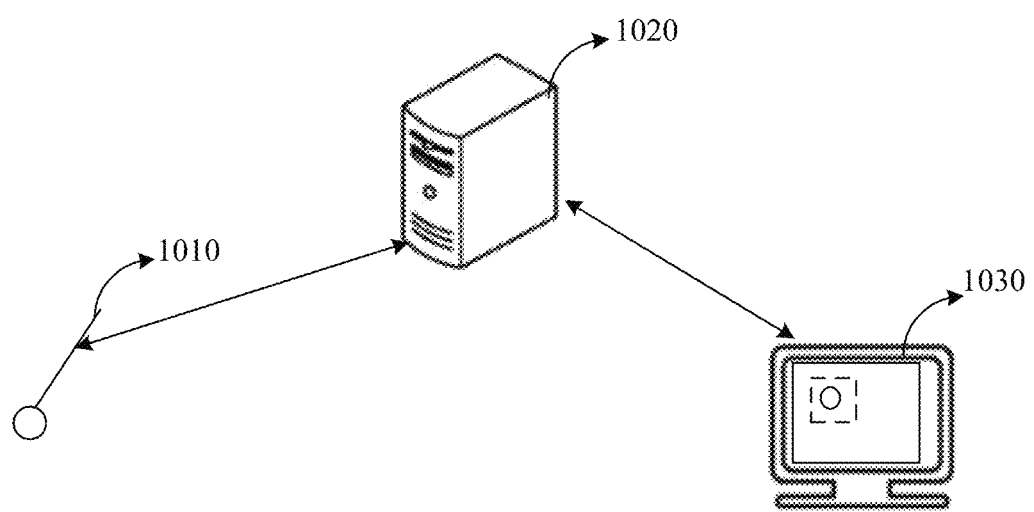
FIG. 10 is a schematic block diagram of a medical image analysis system according to some embodiments of the present disclosure.

The following describes a medical image analysis system 1000 according to some embodiments of the present disclosure with reference to FIG. 10.

FIG. 10 is a block diagram of a medical image analysis system 1000 according to some embodiments of the present disclosure.

Referring to FIG. 10, the medical image analysis system 1000 may include an image collection apparatus 1010, a calculation apparatus 1020, and a display apparatus 1030.

The image collection apparatus 1010 may be configured to collect a to-be-analyzed medical image. For example, the image collection apparatus may include a camera or a video camera.

In some implementations, the image collection apparatus may include an endoscope on which a camera or a video camera is installed. A to-be-detected object (for example, a human or an animal) may be checked by using the image collection apparatus to collect a to-be-analyzed medical image. For example, the image collection apparatus may be sent from the outside to the inside of a human body through a natural cavity to collect a medical image of an internal organ (for example, an oral cavity, an esophagus, a throat, intestines and stomach (for example, a stomach, a duodenum, or a colorectum), a lung, or a heart), so as to check a state of the internal organ (for example, a healthy state or a morbid state). For example, the type of the to-be-analyzed medical image may be a living tissue image.

The calculation apparatus 920 may be coupled to the image collection apparatus 910 and includes at least one processor and a memory. The memory is configured to store at least one computer program. The at least one computer program, when executed by the at least one processor, implements: obtaining the to-be-analyzed medical image; performing image classification on the medical image by using an image classification network, to obtain an image classification result indicating an image category of the medical image, the image category including a first category and a second category different from the first category; performing object detection on the medical image by using an object detection network, to obtain an object detection result indicating whether a target object associated with the first category is detected; and generating an image analysis result of the medical image based on the image classification result and the object detection result.

In some implementations, when the at least one computer program is executed by the at least one processor 911, the at least one processor implements some or all of the methods in the embodiments of the present disclosure described above.

In some implementations, the calculation apparatus 1020 may include a smartphone, a tablet personal computer (PC), a server, a mobile phone, a video phone, an e-book reader, a desktop PC, a laptop computer, a netbook computer, a personal digital assistant (PDA), a portable multimedia player (PMP), an MP3 player, a mobile medical device, a camera, or a wearable device (for example, a head-mounted device (HMD), electronic clothes, an electronic wristband, an electronic necklace, an electronic finisher, an electronic jewelry, an electronic tattoo, or a smart watch).

In some implementations, the calculation apparatus 1020 may be wiredly or wirelessly connected to the image collection apparatus.

The display apparatus 1030 may be coupled to the calculation apparatus 1020 and configured to display the image analysis result.

In FIG. 10, the display apparatus 1030 and the calculation apparatus 1020 are shown as separate parts, but the embodiments of the present disclosure are not limited thereto. For example, the display apparatus 1030 may be integrated with the calculation apparatus 1020, or implemented as a part of the calculation apparatus 1020.

Certain embodiment(s) of the present disclosure describes the image analysis system 1000 according to some embodiments of the present disclosure. In some embodiments of the present disclosure, the image analysis system 1000 performs target detection of the image by combining the image classification result from the image classification network and the object detection result from the object detection network, to generate the image analysis result for the image, and can adjust network parameters of the image classification network and the object detection network according to the corresponding image analysis result, thereby implementing image analysis, and improving precision.

For example, the image analysis system 1000 may be configured to analyze a living tissue image. In certain embodiment(s), the first category is a lesion category, the second category is a non-lesion category (i.e., a normal category), and the target object is a lesion region corresponding to the lesion category. For example, the lesion category may include a benign lesion category or a malignant lesion category. By using the image analysis system 900 according to some embodiments of the present disclosure, precision of detecting a lesion region can be improved, and a false positive problem can be avoided.

The term unit (and other similar terms such as subunit, module, submodule, etc.) in this disclosure may refer to a software unit, a hardware unit, or a combination thereof. A software unit (e.g., computer program) may be developed using a computer programming language. A hardware unit may be implemented using processing circuitry and/or memory. Each unit can be implemented using one or more processors (or processors and memory). Likewise, a processor (or processors and memory) can be used to implement one or more units. Moreover, each unit can be part of an overall unit that includes the functionalities of the unit.

As used herein, the term "modules" may include units configured in hardware, software, or firmware and/or any combination thereof, and may be used interchangeably with other terms (e.g., logic, logical blocks, components, or circuits). The module may be a single integral component or a minimum unit or component that performs one or more functions. The module may be implemented mechanically or electronically, and may include but is not limited to a known or to-be-developed dedicated processor, CPU, application specific integrated circuit (ASIC) chip, field programmable gate array (FPGA), or programmable logic device that performs certain operations.

According to the embodiments of the present disclosure, at least a part of the apparatus (e.g., a module or a function thereof) or the method (e.g., an operation or a step) may be implemented as, for example, instructions stored in a computer readable storage medium in the form of a program module. When the processor executes the instructions, the instructions may enable the processor to execute a corresponding function. The computer readable medium may include, for example, a hard disk, a floppy disk, a magnetic medium, an optical recording medium, a DVD, and a magneto-optical medium. The instructions may include code created by a compiler or code executable by an interpreter. The modules or programming modules according to various embodiments of the present disclosure may include at least one or more of the components, may omit some of them, or further include other additional components. Operations performed by the modules, programming modules, or other components according to various embodiments of the present disclosure may be performed sequentially, in parallel, repeatedly, or inspired, or at least some operations may be performed in different order or omitted, or other operations may be added.

The are merely exemplary embodiments of the present disclosure, and are not intended to limit the protection scope of the present disclosure. The protection scope of the present disclosure is determined by the appended claims.

INDUSTRIAL APPLICABILITY

The embodiments of the present disclosure disclose the image analysis method, the image analysis apparatus, and the image analysis system. The embodiments of the present disclosure may include: obtaining a to-be-analyzed image; performing image classification on the image by using an image classification network, to obtain an image classification result of an image category of the image, the image category including a first category and a second category different from the first category; performing object detection on the image by using an object detection network, to obtain an object detection result of a target object associated with the first category; and generating an image analysis result of the image based on the image classification result and the object detection result. The present disclosure can improve precision of target detection.

What is claimed is:

1. An image analysis method, performed by an image analysis apparatus and comprising:
   obtaining an image, the image being an endoscopic tissue image;
   performing image classification on the image by using an image classification network, to obtain an image classification result of an image category of the image, the image category including a first category and a second category different from the first category, the first category being a lesion category indicating that the image includes at least one lesion region, and the second category being a non-lesion category indicating that the image does not include a lesion region;
   performing object detection on the image by using an object detection network, to obtain an object detection result of a target object associated with the first category, the object detection result indicating whether a candidate lesion region corresponding to the lesion category is detected by the object detection network; and
   generating an image analysis result of the image based on the image classification result and the object detection result, comprising:
      in response to the image classification result indicating that the image category is the non-lesion category and the object detection result indicating that the candidate lesion region is detected, comparing a first confidence level corresponding to the second category with a first threshold, and indicating, by the image analysis result, whether the image has the target object based on whether the first confidence level is less than or equal to the first threshold; and
      in response to the image classification result indicating that the image category is the lesion category and the object detection result indicating that the candidate lesion region is not detected, comparing a second confidence level corresponding to the first category with a second threshold, and indicating, by the image analysis result, whether the image has the target object based on whether the second confidence level is greater than the second threshold.

2. The image analysis method according to claim 1, wherein generating the image analysis result comprises:
    indicating, by the image analysis result, that the image has the target object, in response to determining that the image classification result indicates that the image category is the lesion category, and the object detection result indicates that the candidate lesion region is detected; and
    indicating, by the image analysis result, that the image does not have the target object, in response to determining that the image classification result indicates that the image category is the non-lesion category, and the object detection result indicates that the candidate lesion region is not detected.

3. The image analysis method according to claim 2, wherein the image analysis result includes the image in which the target object is marked.

4. The image analysis method according to claim 1, wherein performing the object detection on the image comprises:
    determining at least one candidate region and a plurality of detection confidence levels corresponding to the at least one candidate region;
    indicating, by the object detection result, that the image does not have the target object, in response to determining that each of the plurality of detection confidence levels is less than or equal to a preset detection threshold; or
    indicating, by the object detection result, that the image has the target object, in response to determining that at least one of the plurality of detection confidence levels is greater than the detection threshold.

5. The image analysis method according to claim 4, wherein the image analysis result includes information about a first candidate region, and the first candidate region corresponds to the maximum detection confidence level of the plurality of detection confidence levels.

6. The image analysis method according to claim 4, wherein the first category comprises a first sub-category and a second sub-category, and wherein the image analysis result includes at least one of information about a second candidate region and information about a third candidate region, the second candidate region corresponding to the maximum detection confidence level of a plurality of detection confidence levels associated with the first sub-category, and the third candidate region corresponding to the maximum detection confidence level of a plurality of detection confidence levels associated with the second sub-category.

7. The image analysis method according to claim 1, further comprising:
    obtaining a training dataset, the training dataset comprising at least one standard sample and at least one interference sample, the at least one inference sample including an inference image belonging to the non-lesion category, the at least one standard sample including a sample image belonging to the lesion category, wherein an image quality of the interference image is lower than an image quality of the standard image;
    annotating training samples in the training dataset; and
    training the image classification network and the object detection network based on the annotated training dataset.

8. The image analysis method according to claim 7, wherein annotating the training samples comprises:
    annotating a category of the at least one standard sample and a category of the at least one interference sample to obtain a first annotation sample set; and
    annotating the target object of the at least one standard sample and the target object of the at least one interference sample to obtain a second annotation sample set, so as to train the image classification network by using the first annotation sample set, and train the object detection network by using the second annotation sample set.

9. The image analysis method according to claim 7, wherein training the image classification network comprises:
    substituting different medical image training samples in the second annotation sample set into loss functions respectively corresponding to the image classification network and the object detection network; and
    determining that the loss functions correspond to model parameters of the image classification network and the object detection network in response to determining convergence conditions are satisfied.

10. The image analysis method according to claim 1, wherein the image classification network includes a densely connected convolutional network or a residual network, and
    wherein the object detection network is a deep neural network that performs detection in a manner of multi-scale fusion and includes a plurality of residual blocks, an average pooling layer, a connection layer by 1×1 convolution, and softmax; and
    the object detection network includes a YOLO target detection network or a RetinaNet target detection network.

11. The method according to claim 1, wherein:
    when training the objection detection network, the object detection network is initialized using parameters trained by an opensource data set with a data volume of over one-million-level.

12. An image analysis apparatus, comprising: a memory storing computer program instructions; and a processor coupled to the memory and configured to execute the computer program instructions and perform:
    obtaining an image, the image being an endoscopic tissue image;
    performing image classification on the image by using an image classification network, to obtain an image classification result of an image category of the image, the image category including a first category and a second category different from the first category, the first category being a lesion category indicating that the image includes at least one lesion region, and the second category being a non-lesion category indicating that the image does not include a lesion region;
    performing object detection on the image by using an object detection network, to obtain an object detection result of a target object associated with the first category, the object detection result indicating whether a candidate lesion region corresponding to the lesion category is detected by the object detection network; and
    generating an image analysis result of the image based on the image classification result and the object detection result, comprising:
        in response to the image classification result indicating that the image category is the non-lesion category and the object detection result indicating that the candidate lesion region is detected, comparing a first confidence level corresponding to the second category with a first threshold, and indicating, by the image analysis result, whether the image has the target object based on whether the first confidence level is less than or equal to the first threshold; and in response to the image classification result indicating that the image category is the lesion category and the object detection result indicating that the candidate lesion region is not detected, comparing a second confidence level corresponding to the first category with a second threshold, and indicating, by the image analysis result, whether the image has the target object based on whether the second confidence level is greater than the second threshold.

13. The image analysis apparatus according to claim 12, wherein the processor is further configured to execute the computer program instructions and perform:

indicating, by the image analysis result, that the image has the target object, in response to determining that the image classification result indicates that the image category is the lesion category, and the object detection result indicates that the candidate lesion region is detected; and indicating, by the image analysis result, that the image does not have the target object, in response to determining that the image classification result indicates that the image category is the non-lesion category, and the object detection result indicates that the candidate lesion region is not detected.

14. The image analysis apparatus according to claim 13, wherein the image analysis result includes the image in which the target object is marked.

15. The image analysis apparatus according to claim 12, wherein performing the object detection on the image includes:

determining at least one candidate region and a plurality of detection confidence levels corresponding to the at least one candidate region;

indicating, by the object detection result, that the image does not have the target object, in response to determining that each of the plurality of detection confidence levels is less than or equal to a preset detection threshold; or indicating, by the object detection result, that the image has the target object, in response to determining that at least one of the plurality of detection confidence levels is greater than the detection threshold.

16. A non-transitory computer-readable storage medium storing computer program instructions executable by at least one processor to perform:

obtaining an image, the image being an endoscopic tissue image;

performing image classification on the image by using an image classification network, to obtain an image classification result of an image category of the image, the image category including a first category and a second category different from the first category, the first category being a lesion category indicating that the image includes at least one lesion region, and the second category being a non-lesion category indicating that the image does not include a lesion region;

performing object detection on the image by using an object detection network, to obtain an object detection result of a target object associated with the first category, the object detection result indicating whether a candidate lesion region corresponding to the lesion category is detected by the object detection network; and generating an image analysis result of the image based on the image classification result and the object detection result, comprising:

in response to the image classification result indicating that the image category is the non-lesion category and the object detection result indicating that the candidate lesion region is detected, comparing a first confidence level corresponding to the second category with a first threshold, and indicating, by the image analysis result, whether the image has the target object based on whether the first confidence level is less than or equal to the first threshold; and in response to the image classification result indicating that the image category is the lesion category and the object detection result indicating that the candidate lesion region is not detected, comparing a second confidence level corresponding to the first category with a second threshold, and indicating, by the image analysis result, whether the image has the target object based on whether the second confidence level is greater than the second threshold.

\* \* \* \* \*